United States Patent [19]
Baucom

[11] 3,933,971
[45] Jan. 20, 1976

[54] MOLYBDENUM RECOVERY
[75] Inventor: Everett Ira Baucom, Kennett Square, Pa.
[73] Assignee: E. I. Du Pont de Nemours & Company, Wilmington, Del.
[22] Filed: Feb. 18, 1975
[21] Appl. No.: 550,851

Related U.S. Application Data
[63] Continuation-in-part of Ser. No. 436,949, Jan. 28, 1974, abandoned.

[52] U.S. Cl. ............ 423/54; 423/9; 423/139; 75/101 BE
[51] Int. Cl.² .................................. C01G 39/00
[58] Field of Search ............. 423/54, 139, 658.5; 75/101 BE

[56] References Cited
UNITED STATES PATENTS

| 3,083,085 | 3/1963 | Lewis et al. | 75/101 BE |
| 3,455,677 | 7/1969 | Litz | 75/101 BE |
| 3,458,277 | 7/1969 | Platzke et al. | 423/54 |
| 3,576,595 | 4/1971 | Chiola et al. | 423/54 |
| 3,681,016 | 8/1972 | Litz | 423/54 |
| 3,739,057 | 6/1973 | Dougherty et al. | 423/54 |
| 3,770,869 | 11/1973 | Kim et al. | 423/54 |

Primary Examiner—Herbert T. Carter

[57] ABSTRACT

A process for the recovery of metal values, principally molybdenum, by contacting an acidic aqueous solution containing iron, copper and sulfate ions in addition to the metal values to be recovered with an alkyl amine dissolved in a water-insoluble liquid hydrocarbon and subsequently contacting the resultant organic phase in multiple stages at controlled pH.

10 Claims, 2 Drawing Figures ved metal.

MOLYBDENUM RECOVERY

CROSS REFERENCE TO RELATED APPLICATIONS

This application is a continuation-in-part of my application U.S. Ser. No. 436,949, filed on Jan. 28, 1974, now abandoned entitled "Molybdenum Recovery."

BACKGROUND OF THE INVENTION

The present invention relates to an improved process for the recovery of metal values present at low concentration in acidic aqueous solutions and more particularly to a process for the extraction of molybdenum values and the like which are present at concentrations relatively lower than other metal values, e.g. copper and iron or ions, e.g. sulfate which are undesirable in the recovered metal.

PRIOR ART

The extraction of metal values from aqueous streams using complexing agents such as amines, e.g. tertiary amines, in organic solvents has been practiced for some time. In certain systems the efficiency of extraction is improved by incorporating certain promoters in the amine-organic. For example, U.S. Pat. No. 2,558,288, issued on Jan. 26, 1971 teaches the use of a carboxylic acid as a promoter and U.S. Pat. No. 3,576,595 teaches the use of an alkyl phosphate promoter. It has been recognized that the ratios of organic extractant to aqueous solution as well as the pH of the aqueous solution affect the extraction as set forth in U.S. Pat. No. 3,598,519, issued on Aug. 10, 1971 and U.S. Pat. No. 3,458,277, issued on July 29, 1969.

Various extractants, e.g. quaternary ammonium compounds (U.S. Pat. No. 3,244,475, issued on Apr. 5, 1961), di-2-ethylhexyl phosphoric acid (U.S. Pat. No. 3,607,008, issued on Sept. 21, 1971) and difatty hydroxyalkyl amines (U.S. Pat. No. 3,341,305, issued on Sept. 12, 1967) have also been disclosed.

The separation of molybdenum from other metal values using amine extractants is disclosed in U.S. Pat. No. 3,681,016, issued on Aug. 1, 1972 while the purification of molybdenum salts by selective crystallization is described in U.S. Pat. No. 3,357,821, issued on Dec. 12, 1967 and U.S. Pat. No. 3,681,016, issued on Aug. 1, 1972. Amine-organic extraction has been applied to a variety of streams including those obtained by the roast leaching of sulfide-containing ore bodies as illustrated in U.S. Pat. No. 3,455,677, issued on July 15, 1969.

SUMMARY OF THE INVENTION

The present invention is directed to a process for recovering metal values, principally molybdenum, from acidic aqueous solutions wherein the concentration of molybdenum is low relative to other ions, e.g. copper, iron and sulfate. As employed herein the term iron means the ferric ion while the term sulfate includes the sulfate ion ($SO_4^-$) as well as other forms of sulfate, e.g. bisulfate. The present process comprises contacting the aqueous acidic solution with an alkyl amine dissolved in a substantially water-insoluble liquid hydrocarbon while maintaining the solution at a pH less than about 4.5 and less than about 1.5 if significant quantities of iron ions are present. If the pH of the aqueous was maintained at less than 1.5 the aqueous and organic phases are separated and the organic phase thereafter contacted with a second aqueous solution maintained at a pH in the range of about 3.0–4.5 to strip the anions which are extracted by the amine along with the metal values. The organic and aqueous phases from either the one-stage or two-stage extraction as described above are separated and thereafter the organic phase is contacted with an aqueous solution maintained at a pH greater than about 4.5 to extract substantially all of the molybdenum values in the organic phase.

DETAILED DESCRIPTION OF THE INVENTION

The extraction process of the present invention is particularly useful in the extraction of molybdenum ions although ions of other transition metals such as chromium, tungsten and uranium can also be extracted. Typically these metal ions are obtained in acidic aqueous solution from conventional hydrometallurgical processes which leach metal values from ores or ore concentrates using acids at elevated temperature. More particularly, the present process can recover molybdenum from a leach solution obtained by countercurrently contacting an ore concentrate, e.g. chalcopyrite, with an aqueous solution of nitric and sulfuric acids at a temperature in the range 100°–110°C. In a typical process the leach solution initially contains, based upon the iron and copper in the chalcopyrite, about 1.4–1.7 parts of sulfuric acid per part of copper, about 2.0–3.0 parts of sulfuric acid per part of iron, and about 2.0–4.0 parts of nitric acid per part of copper and water to produce a final solution containing about 4–9 parts of copper per 100 parts of solution. After the leaching, the nitrate in the solution is then reduced to less than about 10 grams per liter in the presence of fresh concentrate and ferrous ion is generated.

After separating the liquid and solids from the leaching step, the liquid which contains at least 2.7 parts of ferrous ion per part of nitrate ion is then heated to a temperature in the range 160°–180°C. wherein the ferrous and nitrate ions react with the result that the nitrate concentration is reduced to less than about one gram per liter. This solution may be treated according to the process of the present invention. After molybdenum recovery the resultant solution is contacted with ammonia and molecular oxygen at a temperature in the range 160°–180°C. to precipitate iron as ammonojarosite. After the precipitate is removed the solution now containing less than 5 grams/liter or iron is directed to conventional electrolytic cells where 40–75 percent of the copper is recovered by conventional techniques. For example, the solution (electrolyte) can be introduced into cells having a high internal rate of circulation of electrolyte such as those disclosed in U.S. Pat. No. 3,483,568 issued on Dec. 16, 1969 and U.S. Pat. No. 3,558,466 issued on Jan. 26, 1971. Conventionally a current density of 10–20 amps/ft$^2$ is employed and the copper in solution is reduced to about 1–4 parts per 100 parts of solution while maintaining a temperature of 25°–60°C. A portion of this spent electrolyte, e.g. 2–15 percent of the total stream, is removed as purge and treated according to the process of this invention. It should be apparent that the present process can also be applied to hydrometallurgical processes which do not employ nitric acid to leach the ore or which provide a leach solution having low levels of nitrate.

Figure 1:
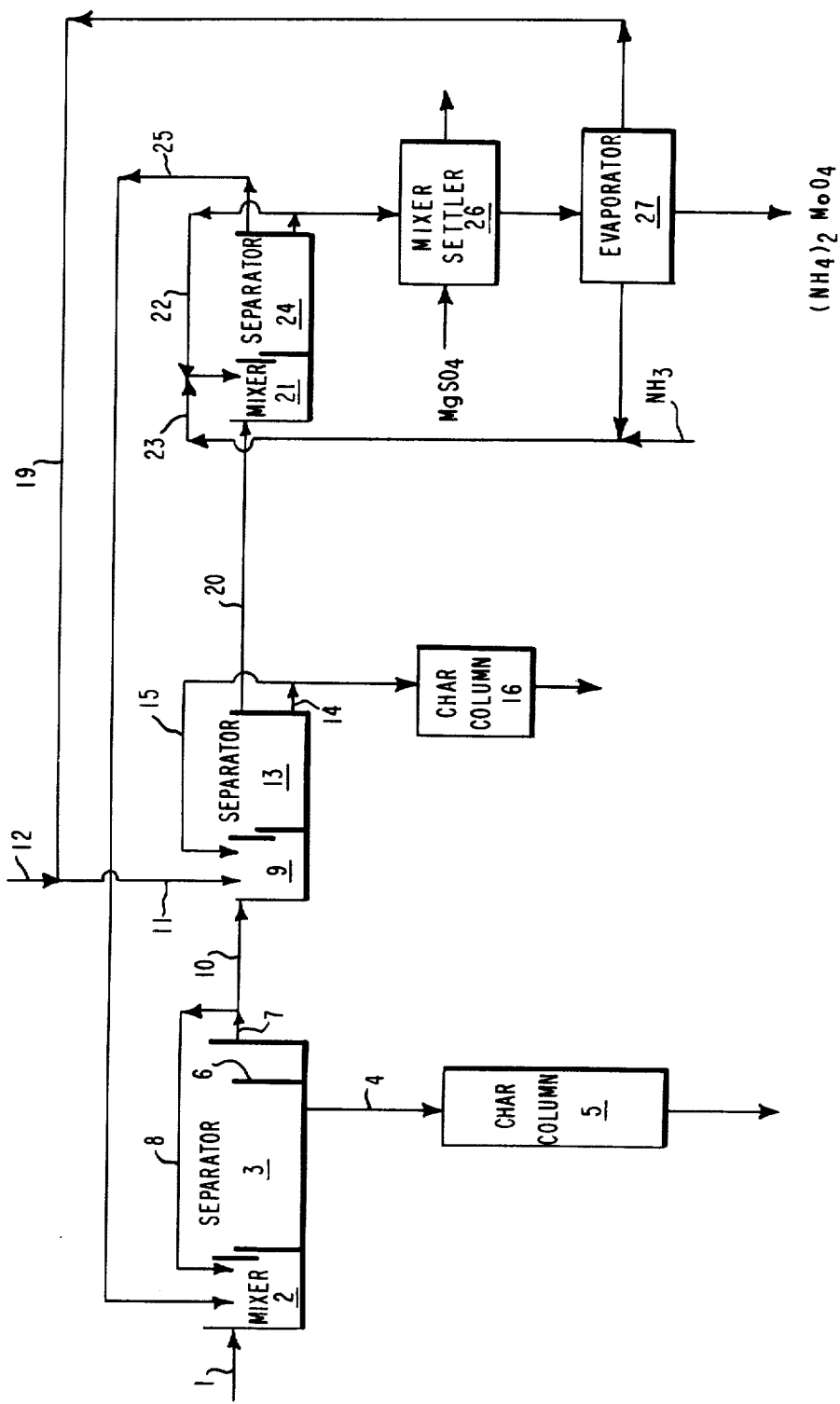
FIG. 1 is a schematic of the present process.

A more complete understanding of the present invention may be had by referring to the drawing of FIG. 1 attached hereto and made a part of the present specification which shows a continuous process for recovering molybdenum values from a leach liquor such as that described hereinabove. The leach liquor is introduced via line 1 into mixer 2 where it is thoroughly contacted with a solution of an amine in an organic liquid introduced via line 25. The mixture then passes to separator 3 where the aqueous phase is removed via line 4 and optionally directed to a suitable device here illustrated as char column 5 to remove residual organic before returning the aqueous stream to the leaching process. The organic phase in separator 3 flows over weir 6 and is continuously withdrawn via line 7 where a portion is recycled via line 8 to mixer 2 and thereby increases the molybdenum content of the organic. The remaining portion of the organic is directed via line 10 to mixer 9 where it is thoroughly contacted with aqueous stream 11 whose pH is controlled by aqueous ammonia introduced via line 12. The mixture is then directed to separator 13 and the resultant aqueous phase is removed via line 14 and a portion thereof recycled to mixer 9 via line 15 to increase the sulfate ion concentration. The remaining portion of the aqueous stream may be discarded or treated in char column 16 for return to the leaching process. The organic phase from separator 13 is directed to mixer 21 via line 20 where it is contacted with a recycle stream 22 where pH is maintained sufficiently high for efficient stripping of the molybdenum by the introduction of ammonia from line 23. The mixture is then passed to separator 24 where the organic phase, now substantially free of molybdenum values, is recycled via line 25 to mixer 2. As set forth above, a portion of the aqueous phase from separator 24 is recycled to mixer 21 via line 22 to increase the concentration of molybdenum therein while the remainder is directed to mixer-settler 26 where, if desired, undesirable heavy metals such as phosphorus and arsenic may be removed as precipitate by the introduction of magnesium sulfate. The liquid is then directed to evaporator 27 and resultant vapors (principally ammonia) are recycled via line 23 to mixer 21. Ammonium molybdate crystallizes in evaporator 27 and is removed while the mother liquor is recycled to mixer 9 via line 19.

The water-insoluble amines employed in the recovery process of the present invention contain sufficient aliphatic hydrocarbon to impart water insolubility while maintaining satisfactory solubility in the organic. Primary, secondary, tertiary and quaternary amines can be employed as well as mono- and polyamines. Examples of the latter include tetradecylhexamethylenediamine, sym. didodecyldioctylhexamethylenediamine and sym. octyltetradecyl-bis hexamethylenetriamine. Tertiary amines of the general formula

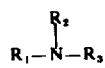

are preferred because of superior iron rejection wherein the $R_1$, $R_2$ and $R_3$ substituents are the same or mixed aliphatic hydrocarbon radicals such that the average number of carbon atoms in the amine is in the range 18–54 and preferably 18–39. Examples of such preferred tertiary amines include the amines tricapryl, triisooctyl, triisodecyl, trilaural, tristridecyl, tridecyl, propyldioctyl, dihexyldodecyl and butyldidecyl. The amine is present at a concentration of 0.15–0.4 and preferably 0.2–0.3 moles per mole of the hydrocarbon solvent therefor.

The substantially water-insoluble solvent for the amine can be any of the hydrocarbon petroleum distillates such as kerosene,, naphtha, benzene, toluene and the like, including mixtures of the foregoing organics. Hydrocarbons having 6–18 carbon atoms are preferred. Also operable as solvents in the present invention are aliphatic hydrocarbons and preferably mixtures thereof with the above aromatics to obtain the advantages of the lower cost and toxicity of the aliphatics while minimizing the disadvantage of lower solubility of the molybdenum amine complex. Readily available aromatic solvents include branched chain benzenes having an average molecular weight of about 150 e.g., those sold under the terms "Hi SOL 15" which contains at least 83 percent aromatics and has a boiling range of 182°–204°C. and a flash point of about 45°C. and "Aromatic 150" which contains about 97 percent aromatics and has a boiling range of 184°–213°C., a flash point of 66°C. and a specific gravity of 0.89. Available aliphatic hydrocarbons include those sold under the term "Napoleum 470" which is a distillate of sweet midcontinent crudes and has a specific gravity of 0.81, a distillation range of 210°–240°C., an average molecular weight of about 175 and a flash point of 83°C. The selection of the organic solvent is not critical provided that the amine is sufficiently soluble therein and the resultant organic solution is readily separable from the aqueous streams being treated.

Figure 2:
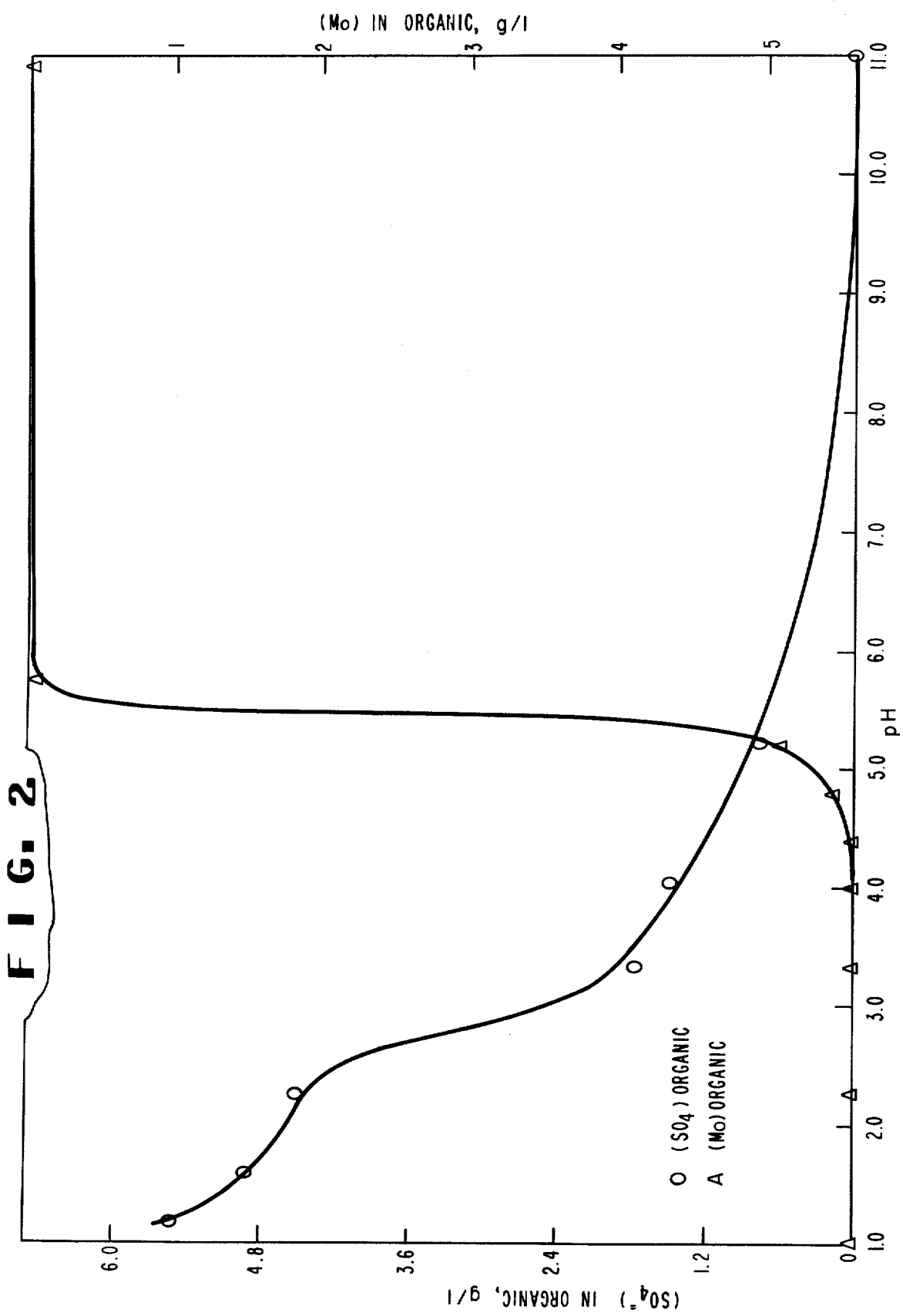
FIG. 2 is a plot of the concentration of sulfate and molybdenum in the aqueous stripping solution vs. pH of the solution.

Control of the pH of the various aqueous streams which contact the amine-organic and the maintenance of a minimum nitrate concentration are important to the efficient practice of the process of the present invention. In one embodiment of this process the pH of the aqueous stream in the initial extraction is controlled to prevent iron pickup by the amine which can occur to an appreciable extent at a pH above about 1.1 at normally employed amine concentration. Iron interferes with phase separation and more sophisticated separation procedures are required if it is present. Slightly higher pH, i.e. 1.2–1.3 is acceptable at lower amine concentrations, however, the extraction efficiency or distribution coefficient for molybdenum decreases with at least about the second or third power of the amine concentration whereas the iron extraction decreased only by the first power with decreasing amine concentration. Although iron extraction decreases with decreasing pH, a commercially acceptable degree of molybdenum extraction is not realized at a pH below about 0.5. Thus the initial extraction of aqueous solution containing significant amounts of iron, i.e., above about 0.5 grams/liter, should be conducted at a pH in the range 0.5–1.3. If the concentration of iron is greater than about 15 grams per liter in the aqueous solution, it is preferred to conduct the initial extraction at a pH in the range 0.8–1.0. As will be apparent to those skilled in the art, the above pH range can vary somewhat depending principally upon the concentration of amine, iron, sulfate and molybdenum in the aqueous stream and the temperature and ratio of organic to aqueous solutions. The adjustment of the foregoing variables to realize satisfactory iron rejection at a pH somewhat outside of the above range is possible without departing from the spirit of the present invention. Sulfate is extracted by the amine-organic along with desired metal values, principally molybdenum, making it necessary to control the concentration of sulfate in the present system to minimize contamination of the molybdenum with sulfur. In accord with the present invention sulfate is controlled after the initial extraction by stripping a substantial portion thereof from the metal rich organic phase under controlled pH. It has been found that the sulfate retained in the organic phase decreases more rapidly than molybdenum with increasing pH. This function is illustrated graphically in FIG. 2 attached hereto and made a part of the present specification. The values depicted were generated by contacting 100 parts by volume of an organic solution containing 10 percent "Alamine 336" (a tertiary amine wherein the number of carbon atoms in the substituent groups averages about 8) in "Aromatic-150" with 80 parts by volume of an aqueous stream initially containing 200 grams per liter $SO_4^=$ and 6 grams per liter of Mo and then separating the aqueous and organic phases. Approximately 100 parts of the organic phase was then contacted with 70 parts of an aqueous solution containing 12 grams/liter $SO_4^=$ while varying pH by the addition of sodium hydroxide to the mixture. The system was maintained at room temperature during the test. It may be seen that under the above conditions the concentration of sulfate in the organic decreases rapidly in the pH range of about 1.3 to 4.5 while the concentration of molybdenum is substantially unchanged. The decrease in sulfate above a pH 4.5 is more gradual, however, the concentration of molybdenum begins to decrease above pH 4.5 to about 5.0 where the decrease becomes rather abrupt. Thus it was found that the undesirable sulfate may be preferentially stripped from the organic phase to acceptable low levels without stripping a significant amount of molybdenum. It is preferred to strip the sulfate at a pH in the range 3.5–4.5.

After the desired amount of sulfate is stripped the organic can be recovered and then contacted with an aqueous solution having a pH greater than about 4.5 and preferably greater than 5.5 and most preferably in the range 7.0 –10.0 to strip molybdenum without stripping unacceptable amounts of sulfate.

Nitrate is extracted along with the sulfate but is not conveniently removed when the sulfate is stripped. Any nitrate which is taken up by the amine is subsequently stripped along with the molybdenum with the result that greater amounts of ammonium nitrate are formed which must be removed before the final recovery of molybdenum.

The following examples are presented to illustrate but not to restrict the present invention.

EXAMPLE 1

The apparatus employed to practice the process of the present invention consisted of five mixer-settler tanks of stainless steel having dimensions of 10 inches × 3 inches × 3 inches, with each tank being divided into a mixing, settling and overflowing compartment with the settling compartment occupying approximately twice the volume of the mixing or overflow compartments. The liquid transfer is arranged to provide countercurrent flow of organic and aqueous phases in each of the three extraction stages. More particularly, the organic phase or solution is introduced into the mixing section of the first extractor and the aqueous phase or solution is introduced in the mixing section of the third extractor. Spent aqueous solution is withdrawn as the lower layer from the first extractor and molybdenum rich organic phase is withdrawn from the overflow compartment of the third extractor. The aqueous solution from the lower layer of the settling compartment of the second extractor is directed to the mixing compartment of the first extractor and the aqueous solution from the lower layer of the settling compartment in the third extractor is directed to the mixing compartment of the second extractor. The organic phase passes from the overflow compartment of the first extractor to the mixing compartment of the second extractor and from the overflow compartment of the second extractor to the mixing compartment of the first extractor. The organic phase from the overflow compartment of the third extractor is passed to the mixing section of the first stripping stage and from the overflow compartment of the first stripping stage to the mixing compartment of the second stripping stage. The organic phase from the overflow compartment of the second stripping stage is recycled to the mixing stage of the first extraction stage. The unit is started up by filling the extraction and stripping stages with an organic solution of 11 percent "Alamine 336" in "HiSOL 15" following which an aqueous solution having the following composition

| | |
|---|---|
| pH | — 0.8 |
| $Fe^{2+}$ | — 2.0 g/l |
| $Fe^{3+}$ | — 33.0 g/l |
| Cu | — 70.0 g/l |
| Mo | — 0.40 g/l |
| Se | — 0.024 g/l |
| As | — 0.020 g/l |
| P | — 0.017 g/l |
| Sb | — 0.013 g/l |
| Te | — 0.012 g/l |
| $NO_3^-$ | — <1 g/l |
| $SO_4^{2-}$ | — balance of anions | is introduced at a rate of 60 ml/min. into the mixing compartments of the third extraction stage. After the settling compartments contained about 50 percent by volume of the aqueous solution the above described organic solution is introduced at 15 ml/minute into the mixing compartment of the first extraction stage. All solutions are maintained at approximately 55°C. in the apparatus. The organic phase entering the separating compartment from the third extraction stage is introduced into the mixing compartment of the first stripper where it is contacted with 10 ml/min. of a solution containing two moles per liter acetic acid and 1.5 moles per liter of ammonium acetate (pH 4.6). The emulsion is permitted to separate and settle in the settling compartment of the first stripping stage and the aqueous phase is removed and recycled to the mixing stage at the above-mentioned rate. The organic phase from the overflow compartment of the first stripping stage is then directed to the mixing compartment of the second stripping stage where it is contacted with 10 ml/min. of an aqueous solution containing two moles per liter of ammonium carbonate (pH 10). The emulsion produced thereby is permitted to separate in the settling compartment of the second stripping stage and the organic phase which is removed from the overflow compartment of the second stripping stage is returned to the mixing compartment of the first extraction stage at the above indicated rate. Periodically ammonium hydroxide is introduced in the recycle stream of the first stripping stage to maintain the pH at approximately 4.6. The depleted aqueous solution is removed from the settling compartment of the first extraction stage and returned to a reservoir where concentrated solutions of sulfuric acid and molybdenum are introduced to maintain the molybdenum and sulfate concentrations and pH substantially constant in the system and to maintain a substantially constant total volume. The recycle organic is analyzed for molybdenum after extended periods of operation and is found to be substantially free of molybdenum, i.e. less than 0.5 percent, while the first stripping stage recycle contains 4.0 grams/liter molybdenum and 3 grams/liter of sulfate. The overall extraction averages approximately 80 percent in the first extraction stage and 94 percent in overall in three stages with three minutes holdup time in each mixing compartment.

EXAMPLE 2

Approximately 50 ml. of aqueous solution which was introduced into the mixing section of the third extraction stage of Example 1 and which contained 6.0 grams per liter of molybdenum was mixed at room temperature with 50 ml. of an organic solution of "Aromatic 150" containing 10 percent of "Alamine 336" (a tertiary amine having chains of 8–10 carbon atoms). The mixture was permitted to settle and the organic phase which contained 5.9 grams/liter of molybdenum and 7 grams/liter of $SO_4^{2-}$ was stirred with 61.5 ml. of 0.81 molar ammonium sulfate while maintaining the pH at approximately 4.7. The phases were then permitted to separate and the organic was clarified by filtration and then stirred with 50 ml. of 6 molar aqueous ammonia. The aqueous phase which contained 5.9 grams/liter of molybdenum and 1.1 grams/liter of $SO_4^{2-}$ was analyzed for arsenic, phosphorus, tellurium, selenium and copper and assuming that all the foregoing would be contained in the molybdenum eventually recovered as the oxide, the oxide would contain 66.7 percent of molybdenum, 0.14 percent arsenic, 0.15 percent phosphorus, 0.005 percent selenium, less than 0.2 percent copper, 0.002 percent antimony and less than 0.007 percent tellurium. Most of the foregoing impurities can be reduced to trace amounts if the aqueous phase is treated with magnesium sulfate before the molybdenum is recovered.

I claim:

1. A process for the recovery of metal values from acidic aqueous solutions comprising ions of molybdenum, iron and sulfate and wherein nitrate is less than one gram per liter of solution comprising (a) contacting said aqueous solution with an extractant consisting essentially of a substantially water-insoluble liquid hydrocarbon having at least 0.15 moles per liter of hydrocarbon of an alkyl amine dissolved therein while maintaining said aqueous solution at a pH of less than about 1.3 to selectively extract molybdenum and sulfate ions into the organic phase and thereafter separating the aqueous phase from the organic phase, (b) contacting the organic phase from step (a) with an aqueous solution maintained at a pH in the range of about 1.3 to about 4.5 to selectively strip sulfate ions from the organic phase and thereafter separating the aqueous phase from the organic phase, (c) contacting the organic phase from step (b) with an aqueous solution maintained at a pH of at least about 4.5 to strip the molybdenum values from said organic phase.

2. The process of claim 1 wherein the alkyl amine is a tertiary amine containing 18–54 carbon atoms and the liquid hydrocarbon is an aromatic hydrocarbon containing 6–18 carbon atoms.

3. The process of claim 2 wherein said amine is present in said hydrocarbon at a concentration of 0.15–0.4 moles per mole of hydrocarbon.

4. The process of claim 3 wherein said concentration is in the range 0.2–0.3 moles per mole of hydrocarbon.

5. The process of claim 3 wherein the tertiary amine contains 18–39 carbon atoms.

6. The process of claim 1 wherein the pH of the aqueous solution is maintained in the following ranges

| 1. Step (a) | — 0.5–1.3 |
| 2. Step (b) | — 1.3–4.5 |
| 3. Step (c) | — greater than 5.5 |

7. The process of claim 6 wherein said amine is present in said hydrocarbon at a concentration of 0.15–0.4 moles per mole of hydrocarbon.

8. The process of claim 7 wherein said tertiary amine contains 18–39 carbon atoms.

9. The process of claim 8 wherein the pH of the aqueous solution is maintained in the following ranges

| 1. Step (a) | — 0.8–1.0 |
| 2. Step (b) | — 3.5–4.5 |
| 3. Step (c) | — 7.0–10.0. |

10. The process of claim 9 wherein the amine is present in said hydrocarbon at a concentration of 0.2–0.3 moles per mole of hydrocarbon.

* * * * *